United States Patent [19]

Malone

[11] Patent Number: 5,126,042
[45] Date of Patent: Jun. 30, 1992

[54] FLOATING MEDIA BIOFILTER

[76] Inventor: Ronald F. Malone, 2017 General Lee Ave., Baton Rouge, La. 708810

[21] Appl. No.: 785,942

[22] Filed: Oct. 31, 1991

[51] Int. Cl.$^5$ .............................................. C02F 3/06
[52] U.S. Cl. .................... 210/150; 210/151; 210/219; 210/221.2; 210/616; 210/618
[58] Field of Search ............... 210/150, 151, 616, 617, 210/618, 221.2, 219

[56] References Cited

U.S. PATENT DOCUMENTS

| | | | |
|---|---|---|---|
| 887,069 | 5/1908 | Cotter . | |
| 2,464,707 | 3/1949 | Montgomery et al. | 210/151 |
| 3,154,601 | 10/1964 | Kalinske et al. | 210/150 |
| 4,009,099 | 2/1977 | Jeris | 210/151 |
| 4,009,105 | 2/1977 | Jeris | 210/151 |
| 4,036,854 | 7/1977 | Chang | 260/343.2 |
| 4,052,300 | 10/1977 | Mosso | 210/20 |
| 4,198,301 | 4/1980 | Iwatani | 210/274 |
| 4,415,454 | 11/1983 | Fuchs | 210/616 |
| 4,547,286 | 10/1985 | Hsiung | 210/738 |
| 4,566,971 | 1/1986 | Reimann et al. | 210/151 |
| 4,576,718 | 3/1986 | Reischl et al. | 210/616 |
| 4,582,600 | 4/1986 | Atkinson et al. | 210/205 |
| 4,608,181 | 8/1986 | Hsiung et al. | 210/786 |
| 4,743,382 | 5/1988 | Williamson et al. | 210/786 |
| 4,898,672 | 2/1990 | Clifft et al. | 210/614 |
| 4,919,815 | 4/1990 | Copa et al. | 210/605 |

FOREIGN PATENT DOCUMENTS 903800  8/1962  Fed. Rep. of Germany .
120867  of 1918  United Kingdom ............... 210/274

OTHER PUBLICATIONS

11335 Apr. 3, 1990 Vacherie Machine Works, Inc.
11336 Apr. 19, 1990 Vacherie Machine Works, Inc.
10050 Oct. 16, 1990 Vacherie Machine Works, Inc.

Primary Examiner—Stanley S. Silverman
Assistant Examiner—Cynthia L. Nessler
Attorney, Agent, or Firm—Robert C. Tucker; William David Kiesel

[57] ABSTRACT

A biofilter is provided, including a tank, having a bottom, a top and a sidewall having a lower portion which is inwardly sloping toward the bottom; floating filter media in the tank, the media forming a floating media pack when the tank is filled with liquid and the media are undisturbed, the media pack having a bottom and a top; a screen having openings adapted to prevent the floating filter media from passing therethrough, positioned in the tank between the bottom of the tank and the top of the tank; an agitator having a blade, the agitator being attached to the tank and adapted such that the blade is at least partially imbedded in the media pack when the tank is filled with liquid; an inlet line fluidly connected to the tank below the screen; a sludge drain line fluidly connected to the lower portion tank below the screen; a sludge valve, positioned in the sludge drain line; and an outlet line fluidly connected to the tank above the screen.

11 Claims, 2 Drawing Sheets

FLOATING MEDIA BIOFILTER

BACKGROUND OF THE INVENTION

1. Field of the Invention.

This invention relates generally to wastewater treatment systems which biologically treat wastewater and, more particularly, to biological treatment systems which utilize floating filter media to biologically treat wastewater.

2. Prior Art.

In high density aquaculture systems, such as catfish farms, and in other water systems which generate wastewater, it is necessary to remove suspended solids, optimize nitrification and to reduce biochemical oxygen demand (BOD) of the wastewater. In all cases, treated water is eventually returned to the ecosystem, whether the return is to a lake or stream or back to a controlled aquaculture system. Varying load and flow conditions make operation of waste treatment systems difficult, in that the timing of treatment steps is dependent upon such changing conditions.

In the operation of any wastewater treatment system, it is desirable to waste as little water as possible and to maximize the concentration of waste sludge accumulated by the system. This is especially true in high density aquaculture systems, where constant recirculation of water is necessary, and where it is desirable to minimize the amount of water wasted in the treatment process. Most prior art systems accomplish treatment using various traditional treatment components, such as aeration basins, filters and clarifier units, with each component having its own treatment and energy consumption limitations. A system which efficiently combines the features of separate component systems would have greater advantages over those presently in use.

SUMMARY OF THE INVENTION

Therefore, it is an object of this invention to provide a floating media biofilter which allows treatment of a wastewater stream in a single treatment device.

It is another object of this invention to provide a floating media biofilter which has a higher carrying capacity (volume of waste processed per cubic foot) than comparable wastewater treatment systems, reducing associated capital costs.

It is still another object of this invention to provide a floating media biofilter which facilitates automated optimization of biofiltration processes (BOD reduction and nitrification).

It is a further object of this invention to provide a floating media biofilter which is particularly adaptable to recirculating waste streams, such as those in high density aquaculture operations.

It is yet another object of this invention to provide a floating media biofilter which reduces aeration, degasification, chemical addition, and water demand of recirculating waste systems by reducing waste impact through rapid biofloc harvesting and solids removal.

It is another object of this invention to provide a floating media biofilter which accomplishes various combinations of the above objects.

Accordingly, a biofilter is provided, including a tank, having a bottom, a top and a sidewall having a lower portion which is inwardly sloping toward the bottom; floating filter media in the tank, the media forming a floating media pack when the tank is filled with liquid and the media are undisturbed, the media pack having a bottom and a top; a screen having openings adapted to prevent the floating filter media from passing therethrough, positioned in the tank between the bottom of the tank and the top of the tank; an agitator having a blade, the agitator being attached to the tank and adapted such that the blade is at least partially imbedded in the media pack when the tank is filled with liquid; an inlet line fluidly connected to the tank below the screen; a sludge drain line fluidly connected to the lower portion tank below the screen; a sludge valve, positioned in the sludge drain line; and an outlet line fluidly connected to the tank above the screen.

DETAILED DESCRIPTION OF PREFERRED EMBODIMENTS OF THE INVENTION

Figure 1:
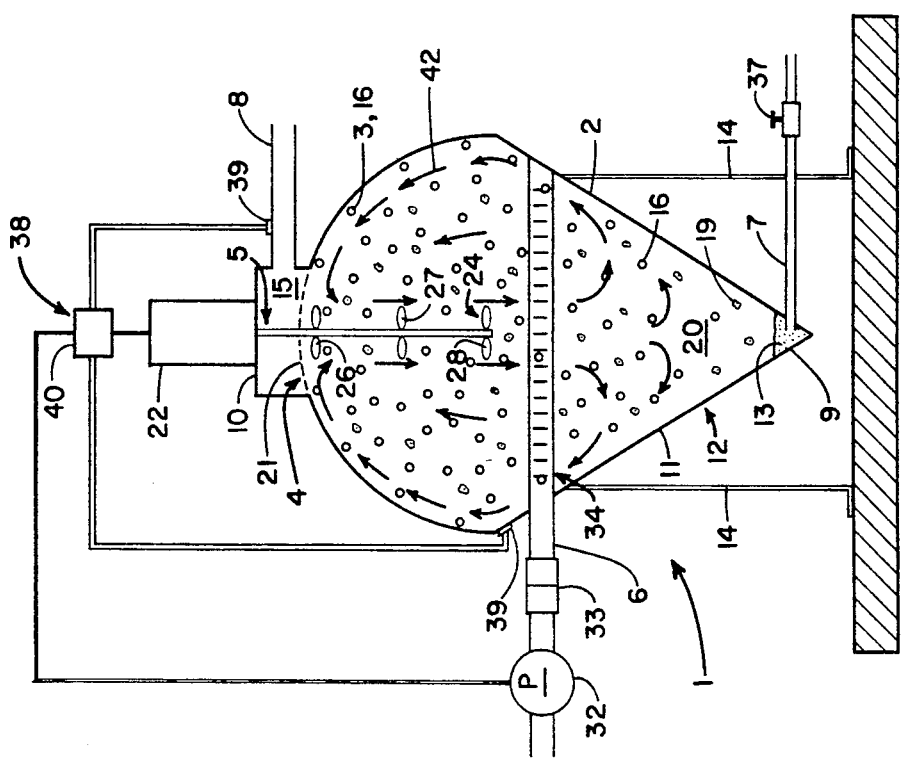
FIG. 1 is a sectional view of an embodiment of the invention during the filtration step of operation.

As shown in the Figures, the floating medial biofilter 1 generally includes a tank 2, floating media 3, a screen 4, an agitator 5, an inlet line 6, a sludge drain line 7 and an outlet line 8. The biofilter 1 performs filtration of suspended solids as well as biological treatment of the waste flowing through the biofilter 1. Backwashing and sludge removal are also accomplished in the same tank 2.

Tank 2 has a bottom 9, a top 10 and a sidewall 11. While the version shown in the Figures is generally round in shape, other shapes may be used. Preferably, top 10 is substantially dome-shaped, as shown. Lower portion 12 of sidewall 11 slopes inwardly toward bottom 9. Lower portion 12 is conical in the embodiment shown in the Figures, allowing for maximum concentration of sludge 13 in bottom 9. A forty-five to sixty degree slope is preferred for the embodiment shown. A flat bottom 9 may also be employed, but it is preferable that bottom 9 be substantially smaller in diameter than the remainder of the tank 2 in order to maximize sludge concentration. Tank 2 may be constructed of any suitable material, such as steel or fiberglass. Tank 2 is supported by any convenient means, such as support base 14.

Inside tank 2 are floating media means 3. Preferably floating media 3 comprise multiple low density granular media pellets 16. Pellets 16 may be of any suitable material, but plastic is preferred. Low density polyethlene feed stock pellets 16 one-eighth inch in diameter have been found to be suitable in experimental units. Enhanced biofiltration can be achieved by shaping the pellets 16 into tubular or fluted shapes (not shown) which influence biofloc retention. Media means 3 form a media pack 17 when tank 2 is filled with wastewater or other liquid, and when media 3 are undisturbed by agitator 5. Screen 4 is positioned in tank 2 above media 3, forming an outlet chamber 15 fluidly connected to outlet line 8. Screen 4, preferably a stainless steel mesh, is adapted to prevent pellets 16 from passing therethrough, having openings 21 which are smaller than pellets 16. Sufficient media 3 should be provided so as to form a media pack 17 which provides coverage of top 10, and has a depth 18 sufficient to provide adequate suspended solids filtration of the particular waste being treated as well as to provide adequate media surface area for biological treatment of the waste flowing through the media pack 17. For the type of biofilter 1 shown in the Figures, a media pack depth 18 of eighteen to twenty-four inches was found to be effective for a tank volume of three hundred gallons and a waste flow of one hundred gallons per minute through a three inch inlet line 6 and a four inch outlet line 8. During treatment, biological growth forms a film on each pellet 16 which in turn provides nitrification and BOD reduction. Suspended solids removed by media pack 17, as well as solids produced by biological treatment (biofloc), form a floc 19, some of which falls from media pack 17 and settles to the bottom 9 of tank 2, forming sludge 13. Also, the portion of tank 2 below inlet line 6 acts as a quiescent zone 20 in which suspended solids will settle toward bottom 9. The biological growth on media 3 will tend to bridge from pellet 16 to pellet 16, requiring periodic agitation of media 3 to loosen solids for removal.

Agitation of media 3 is accomplished using agitator 5. Preferably agitator 5 includes a motor 22 mounted on top 10, and having a shaft 23 rotatably attached to motor 22 and extending downward to a point within media pack 17. Agitator 5 further includes at least one blade 24 attached to shaft 23. Preferably, blade 24 takes the form of a propeller 25, which is pitched so as to induce liquid flow toward bottom 9. Blade 24 is located so as to be at least partially embedded in media pack 17. Preferably, two or three blades 24 are attached to shaft 23. A first blade 26 is positioned just below the top 29 of media pack 17. First blade 26 serves not only to fluidize media pack 17, but also to agitate the area around screen 4, cleaning screen 4 during the backwash step. A second blade 27 is positioned between top 29 and bottom 30 of media pack 17, and a third blade 28 is positioned just above bottom 30 of media pack 17. Second and third blades 29,30 serve to assure fluidization of the core area 31 of media pack 17. Agitator 5 and blade 24 may also take other forms known in the art, so long as operation of agitator 5 fluidizes and agitates media 3 such that floc 19 is sheared from media 3 so that it can settle to bottom 9. It has been found that a 1750 rpm electric motor 22 operating propellers 25 having a three to five inch tip to tip length will sufficiently agitate the media pack 17 of the three hundred gallon tank described above. Blades 24 may be made from stainless steel, titanium or plastic, depending upon the corrosive nature of the wastewater to be treated.

Inlet line 6 is fluidly connected to a pump 32 and to tank 2, and preferably includes a check valve 33. A diffuser 34, such as diffuser pipe 35 having horizonally facing slots 36, is provided on inlet line 6 within tank 2 for providing an even flow of wastewater to media pack 17. Outlet line 8 fluidly connects to top 10, and conducts treated and clarified liquid back to the ecosystem or to the aquaculture system, depending upon the application. Sludge line 7, having sludge valve 37, fluidly connects to bottom 9 and is used to intermittently discharge accumulated sludge 13 from tank 2.

The biofilter 1 may be automated by including a means 38 for determining a pressure differential across filter pack 17 and controlling operation of agitator 5 depending upon the pressure differential, connected to tank 2 and agitator 5. Means 5 preferably includes one or more electronic pressure sensors 39, which are connected to a controller 40 on motor 22. Thus, when the pressure differential across media pack 17 increases to a desired level, controller 40 will deactivate pump 32 and actuate motor 22 for a desired time for backwashing. Motor 22 is deactivated by controller 40 for a settlement period, and then pump 32 is reactivated for further filtration.

Figure 2:
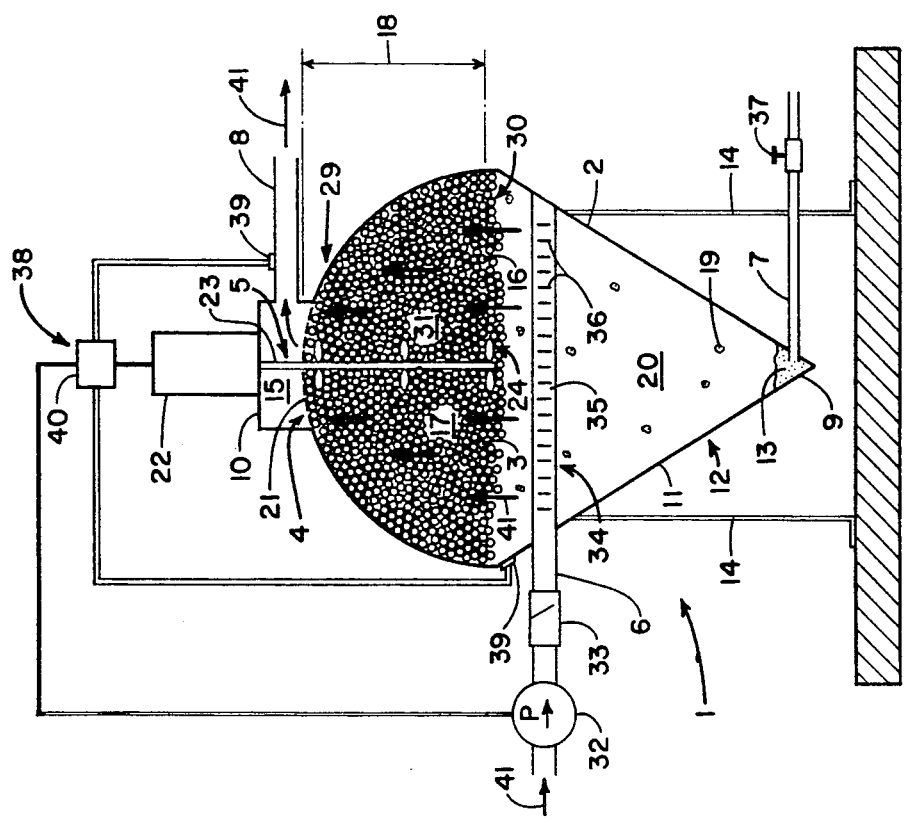
FIG. 2 is a sectional view of an embodiment of the invention during the backwash step of operation.
Figure 4:
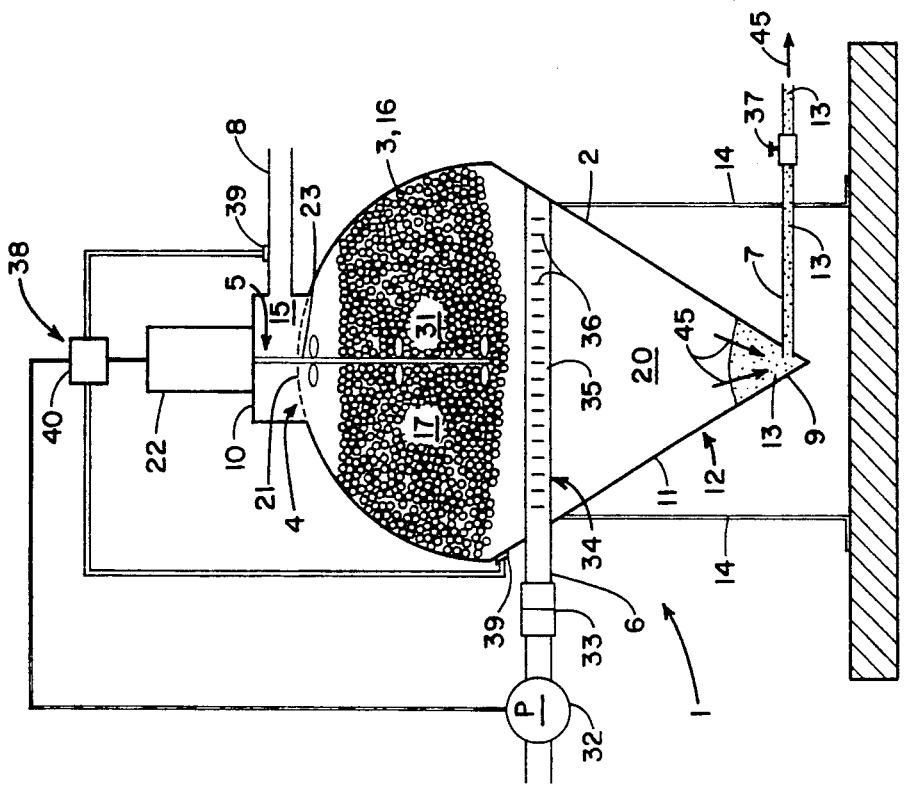
FIG. 4 is a sectional view of an embodiment of the invention during the sludge removal step of operation.
Figure 3:
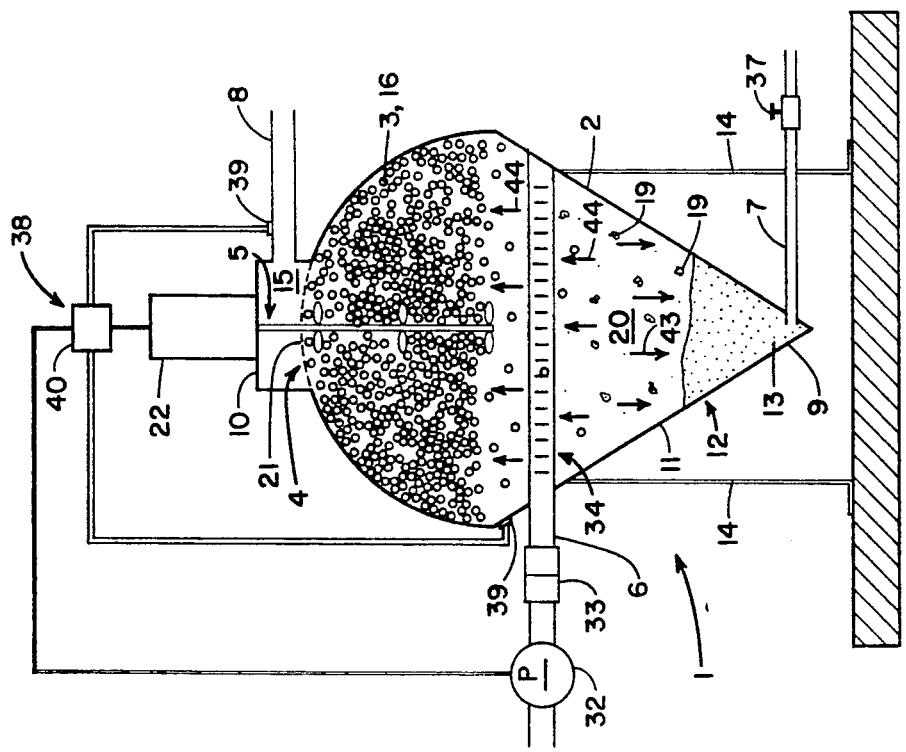
FIG. 3 is a sectional view of an embodiment of the invention during the settling step of operation.

Operation of the biofilter 1 is illustrated sequentially in FIGS. 1-4. FIG. 1 depicts the biofilter in filtration mode, with pump 32 in operation, check valve 33 open, sludge valve 37 closed and flow through media pack 17 established. Flow arrows 41 depict flow during filtration. As shown in FIG. 2, the backwashing step is accomplished with pump 32 deactivated, check valve 33 closed, sludge valve 37 closed and agitator 5 in operation so as to fluidize media 3, as shown by flow arrows 42. FIG. 3 depicts the settling step, with pump 32 and agitator 5 deactivated so as to allow floc 19 to settle to bottom 9 (in the direction of flow arrows 43) and a clean media pack 17 to reform (in the direction of flow arrows 44). FIG. 4 depicts the sludge removal step (with sludge flow in the direction of flow arrows 45), with sludge valve 37 open and pump 32 deactivated. Sludge valve 37 remains open only long enough to remove the accumulated concentrated sludge 13 from bottom 9. Thus, when liquid flowing through sludge drain line 7 becomes clear, sludge valve 37 may be closed, minimizing sludge disposal volumes. Sludge removal may also be accomplished during filtration. Sludge valve 37 may also be operated electronically by controller 40 using a optical monitoring sensor (not shown) in sludge drain line 7 to determine liquid clarity so as to signal controller 40 when to close sludge valve 37 utilizing a solenoid (not shown) or other means known in the art.

Other embodiments of the invention 1 will occur to those skilled in the art, and are intended to be included within the scope and spirit of the following claims.

I claim:

1. A biofilter, comprising:
   a. a tank, having a bottom, a top and a sidewall having a lower portion which is inwardly sloping toward said bottom;
   b. floating media means in said tank for forming a floating media pack when said tank is filled with liquid and said media means are undisturbed, said media pack having a bottom and a top;
   c. a screen having openings adapted to prevent said media means from passing therethrough, positioned in said tank above said floating media means;
   d. an agitator having a blade, said agitator being attached to said tank and adapted such that said blade is at least partially imbedded in said media pack when said tank is filled with liquid;
   e. an inlet line fluidly connected to said tank below said screen;
   f. a sludge drain line fluidly connected to said tank below said screen;
   g. a sludge valve, positioned in said sludge drain line; and
   h. an outlet line fluidly connected to said tank above said screen.

2. A biofilter according to claim 1, further comprising a diffuser fluidly connected to said inlet line and positioned so as to be below said media pack when said tank is filled with liquid.

3. A biofilter according to claim 1, wherein said lower portion of said sidewall is substantially conically-shaped.

4. A biofilter according to claim 1, wherein said top is substantially dome-shaped.

5. A biofilter according to claim 1, wherein said floating media means includes a plurality of low density granular media pellets.

6. A biofilter according to claim 1, wherein said agitator includes a motor attached to said top of said tank, a shaft rotatably attached to said motor and extending into said tank to a point below said screen, said blade being fixedly attached to said shaft.

7. A biofilter according to claim 1, wherein said blade is pitched so as to induce liquid flow toward said bottom.

8. A biofilter according to claim 1, wherein a plurality of said blades are provided.

9. A biofilter according to claim 8, wherein a first said blade is positioned just below said top of said media pack.

10. A biofilter according to claim 9, wherein three said blades are provided, and wherein a second said blade is positioned between said bottom of said media pack and said top of said media pack, and a third said blade is positioned just above said bottom of said media pack.

11. A biofilter according to claim 1, further comprising a means for determining a pressure differential across said media pack and for controlling operation of said agitator depending upon said pressure differential, said means being connected to said tank and said agitator.

* * * * *